Jan. 8, 1952   C. W. GRASHAM   2,581,479
PALMTREE PRUNER
Filed April 19, 1948   2 SHEETS—SHEET 1

Inventor
Charles W. Grasham
By Lyon & Lyon
Attorneys

Jan. 8, 1952     C. W. GRASHAM     2,581,479
PALMTREE PRUNER
Filed April 19, 1948     2 SHEETS—SHEET 2
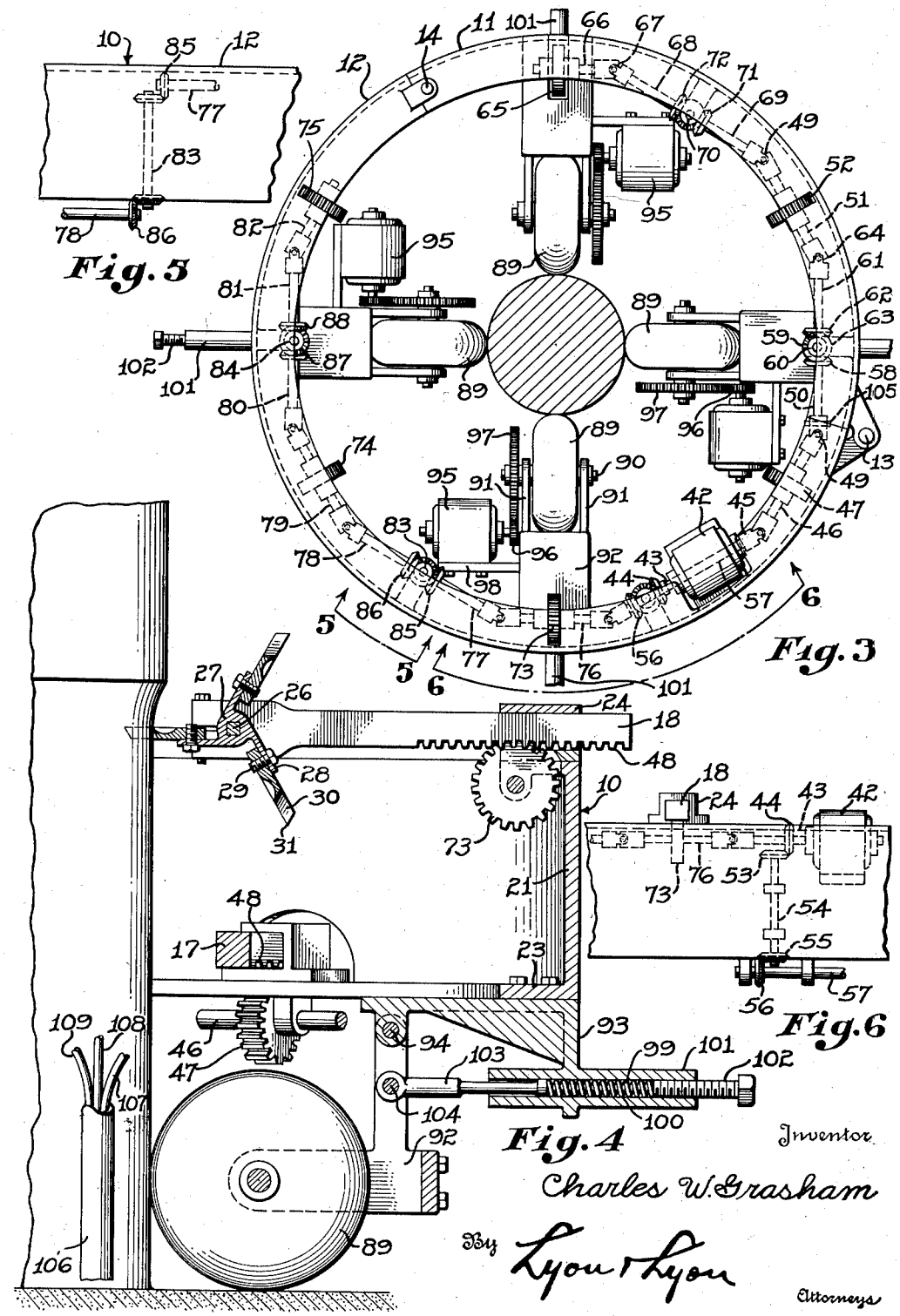
Inventor
Charles W. Grasham
By Lyon & Lyon
Attorneys Patented Jan. 8, 1952

2,581,479

UNITED STATES PATENT OFFICE 2,581,479

PALM TREE PRUNER

Charles W. Grasham, Dallas, Tex.

Application April 19, 1948, Serial No. 21,843

4 Claims. (Cl. 47—1)

This invention relates to a device for pruning or trimming the trunk of a tree, and is particularly directed toward an apparatus for pruning a palm tree.

The pruning of palm trees as now carried out by conventional methods involves cutting of the individual fronds from the main trunk by means of a curved saw secured at the end of a long pole. When the tree is considerably taller than the convenient length of the pole, a man must either climb the tree or be supported on a ladder while operating the saw directly overhead. This is a disagreeable and difficult, if not dangerous, operation, and accordingly the labor cost for pruning tall palm trees becomes out of proportion to the benefits achieved by pruning the dead fronds which hang beneath the growing portion of the tree. One of the principal hazards in trimming or pruning a tall palm tree by conventional methods is that the user of the saw is apt to be struck by fronds as they are cut from the trunk, and may even be dislodged from his precarious position on the trunk.

Accordingly, it is a principal object of my invention to provide a power operated device adapted to ascend a palm tree to any desired height and remove the fronds as it travels upwardly.

A related object is to provide control means for such pruning device which may be operated by a man standing on the ground or at some other remote point.

Another object is to provide a novel form of drive for causing the device to ascend the tree.

Another object is to provide a plurality of cutters rotatable about horizontal axes and positioned around the periphery of the tree, the cutters having curved edges which overlap in operation to avoid grooving the tree trunk longtudinally.

A further object is to provide radial feed means for the cutters in order to accommodate variations in the diameter of the tree trunk.

Various other objects and advantageous features of this invention may be had from the following description, and one embodiment thereof may be seen in the accompanying drawings wherein similar characters of reference designate corresponding parts, and wherein:

Figure 3 is a top plan view of the device shown in Figure 1, the cutter assemblies and supporting structure being omitted in order to show details of the longitudinal and radial feed mechanisms;

Figure 4 is a sectional side elevation similar to Figure 2, but partly broken away and shown on an enlarged scale;

Figure 5 is a partial elevational view taken in the direction 5—5 as shown in Figure 3; and Figure 6 is a similar view taken in the direction 6—6 as shown in Figure 3.

Figure 1:
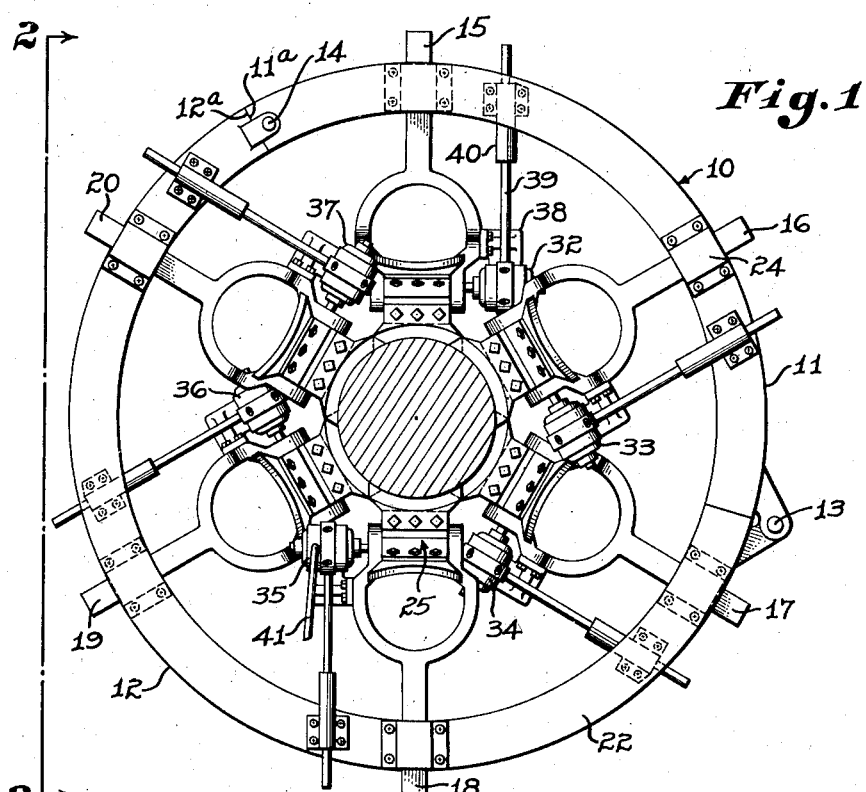
Figure 1 is a top plan view illustrating the preferred embodiment of my invention with background details being omitted for clarity of illustration.

Referring to the drawings, an annular supporting ring generally designated 10 is divided into two arcuate segments 11 and 12 which are connected by means of the pivot 13 and the latch 14. A plurality of yokes 15, 16, 17, 18, 19 and 20 are mounted for radial sliding movement on the annular ring 10, the yokes 16, 18 and 20 being mounted on the upper surface of the ring 10 and the yokes 15, 17 and 19 being mounted adjacent to the lower surface of the ring 10. The ring may be conveniently formed of a cylindrical member 21 having upper and lower flanges 22 and 23, respectively, extending radially inwardly from the cylinder member 21. A guideway 24 is associated with each of the yokes and provides a bearing for sliding movement of each yoke with respect to the ring 10.

A rotary multiple-edged cutter 25 is carried on each of the yokes and is supported for rotation about a horizontal axis. Each cutter assembly includes a horizontal shaft 26 carrying a central hub 27 provided with outwardly extending brackets 28. Removably fixed on each bracket by screws 29 are the cutter blades 30 which have an arcuate cutting edge 31. Individual drive motors 32, 33, 34, 35, 36 and 37 are provided for each of the yokes 15, 16, 17, 18, 19 and 20, respectively, for rotating the cutter assembly 25 carried on each particular yoke. These motors may be electric driven and include within their housing a conventional reduction gear or may be powered by pneumatic or hydraulic means of any conventional type.

Figure 2:
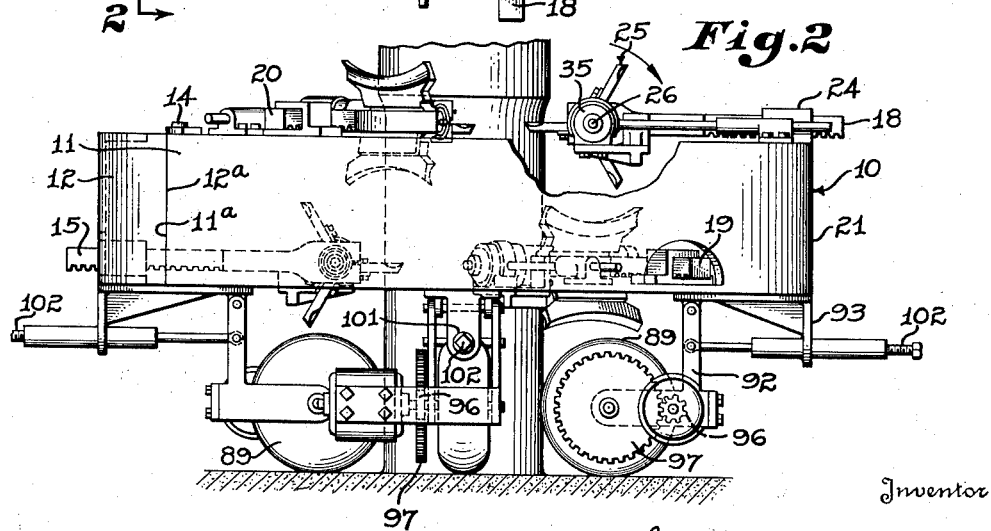
Figure 2 is a side elevation thereof partly broken away, taken in the direction 2—2 as shown in Figure 1.

Each motor is mounted on a bracket 38 carried on its corresponding yoke and, if desired, may also be provided with an auxiliary supporting rod 39 slidably mounted in stationary guides 40 carried on the ring 10. The motors are preferably direct connected to the shafts 26 for rotating the cutter assemblies 25 in the direction indicated by the arrow in Figure 2.

Power supply lines 41 communicate with each motor and extend to a common point (not shown) on the frame 10, from which point a cable depends to the ground level. If the motors are electric driven, a single insulated supply line may be used and the ring 10 and its associated mechanism be employed as the common return. If the motors are hydraulically operated, the supply lines 41 will also include a return hydraulic line. If the motors are pneumatically operated, a single supply line 41 will suffice, their exhaust being made directly to atmosphere.

Means are provided for advancing and retracting each of the cutter assemblies 25 in order to accommodate tree trunks of different diameters and, as shown in the drawings, this means may comprise a feed motor 42 mounted on the upper flange 22 of the annular ring 10. The motor 42 is arranged to turn a drive shaft 43 extending from one end of the motor 42, as shown in Figures 3 and 6. A bevel gear 44 is fixed on the shaft 43 and meshes with a gear 53 fixed on the upper end of a vertical shaft 54. A pair of meshing bevel gears 55 and 56 serve to transmit power from the shaft 54 to a lower shaft 57. A universal joint 45 connects adjacent ends of shafts 57 and 46 and the shaft 46 carries a spur gear 47 adapted to mesh with rack teeth 48 formed on the underside of the yoke 17, such teeth being formed on the underside of each yoke, as shown on yokes 17 and 18 in Figure 4.

A universal joint 49 connects adjacent ends of shafts 46 and 50. A bevel gear 58 on the shaft 50 meshes with a bevel gear 59 on a vertical shaft 60. Rotary motion of the shaft 60 is comunicated to the shaft 61 by means of the cooperating bevel gears 62 and 63.

In a similar manner, shaft 61 is connected to shaft 51 by means of universal joint 64. A gear 52 on the shaft 51 is arranged to drive the yoke 16. The yoke 15 is driven from a gear 65 fixed on a shaft 66 and driven from universal joint 67 via horizontal shafts 68 and 69 and a vertical shaft 70. Two pairs of bevel gears 71 and 72 establish a drive from the shaft 69 to the vertical shaft 70 and from the vertical shaft 70 to the horizontal shaft 68.

From this description, it will be understood that when the motor 42 rotates, the various shafts which are connected by universal joints and by bevel gear shafts rotate so that the spur gears operate to feed the yokes radially of the ring 10.

Similar means are provided for driving feed gears 73, 74 and 75 of the yokes 18, 19 and 20, respectively, and this means includes horizontal shafts 76, 77, 78, 79, 80, 81 and 82 and connecting vertical shafts 83 and 84. Bevel gear sets 85 and 86 form connecting drive means from the shaft 77 to the shaft 78 and bevel gear sets 87 and 88 form connecting drive means from the shaft 80 to the shaft 81. From this description, it will be understood that rotation of the motor 42 simultaneously drives all of the feed gears for moving the yokes radially of the ring 10.

From an inspection of Figure 1, it will be apparent that the arcuate length of the cutting edges of the individual cutter blades is greater than one-sixth of the periphery defined by the radius of the cutter blades. In other words, adjacent cutters overlap and therefore longitudinal disconformities on the tree trunk are avoided. The amount of overlap is sufficient to permit considerable movement of the cutter assemblies radially of the ring 10 before no overlap is present. Since the individual cutter assemblies are independently driven, provision must be made for avoiding interference of the blades as they approach and depart from the neighboring blades during rotation. This interference is avoided by placing one group of cutter assemblies, hereinafter called the primary group, at one elevation with respect to the ring 10 and another group of cutter assemblies, hereinafter called the secondary group at a lower elevation. Thus, the cutter assemblies mounted on yokes 16, 18 and 20 comprise the primary group and the cutter assemblies mounted on yokes 15, 17 and 19 comprise the secondary group. The vertical spacing between the groups serves to avoid interference of the cutter blades even though they may not be rotating in exact synchronism.

Means are provided for elevating the ring 10 and its associated mechanism longitudinally of the tree trunk and, as shown in the drawings, this means includes a plurality of pneumatic tires 89 carried on shafts 90 which are mounted in bearings supported by forks 91. The forks 91 extend radially inwardly from a wheel support member 92 pivotally attached to the lower flange 23 on the ring 10 by means of a supporting bracket 93. Pivot pins 94 serve to connect the member 92 with the bracket 93. An individual drive motor 95 is provided for each of the pneumatic tires 89 and is adapted to turn the tire 89 through driving gears 96 and 97. The motor 95 is mounted on a plate 98 attached to the supporting member 92.

Means are provided for establishing a frictional driving engagement between the pneumatic tires 89 and the tree trunk and this means may include a compression spring 99 mounted within a bore 100 of a radially extending boss 101 carried on the bracket 93.

Threaded into one end of the boss 101 is an adjusting screw 102 and slidably mounted within the other end of the boss is a compression strut 103 pivotally secured to the supporting member 92 at 104. The adjusting screw 102 may be turned relative to the boss 101 to adjust the compression of the spring 99 and hence a force will be exerted on the compression strut 103 in a direction to cause engagement of the pneumatic tire 89 with the tree trunk.

In operation, the ring 10 is first opened about the pivot 13 to provide a space between adjacent ends 11a and 12a of the segments 11 and 12. The device is then moved laterally so that the tree trunk enters through the side opening thus formed.

It will be noted that the latch 14 and adjacent ends of the segments 11 and 12 are positioned at a location on the ring 10 which is free of gearing for the radial feed of the cutter assemblies. The position of the pivot 13 is located adjacent to the universal joint 49 connecting the shafts 46 and 50.

In order that a pivoting motion about the pin 13 may take place without affecting the shafts 46 and 50, the driven end of the coupling 49 connecting these shafts is attached to the shaft 50 by means of a removable pin 105. This pin is first removed before separating the ends 11a and 12a so that the shaft 50 may slide relative to the universal joint 49. When the ends 11a and 12a are again brought into contact with the tree trunk positioned centrally of the ring 10, the pin 105 is reinserted to again establish a driving connection between the shafts 46 and 50.

The adjusting screws 102 are then turned to provide the desired deformation of the pneumatic tires 89 in order that a satisfactory friction drive may be established between the tires 89 and the tree trunk. The individual drive motors 32, 33, 34, 35, 36 and 37 are then energized to cause rotation of the cutter assemblies. The feed motor 42 which is preferably provided with a built-in gear reduction unit is then energized to cause the feed gears 65, 52, 47, 73, 74 and 75 to feed the cutter assemblies radially inwardly to the desired point. The longitudinal feed motors 95 are then energized, causing the pneumatic tires 89 to roll on the periphery of the trunk and cause the entire device to ascend the tree.

A single control cable 106 may extend downwardly from the device and within this control cable are individual leads 107, 108 and 109 for the cutter rotating motors, the radial feed motor 42 and the longitudinal feed motors 95. As pointed out above, these motors may be electrical, pneumatic or hydraulic, as desired. It is also desirable to make radial feed motor 42 and the longitudinal feed motors 95 reversible. An operator standing at the ground level may therefore control the radial feed of the cutter assemblies, as well as the rate and direction of longitudinal feed of the pneumatic tires 89. If desired, speed control means for the motors 32 to 37 may be provided in order that the rotational speed of the cutter assemblies may be varied.

When the device approaches the top of the palm tree and has removed the last dead frond, the rotation of the cutter assemblies may be stopped and the feed motor 42 energized to retract the cutter assemblies from operative position. The direction of rotation of the longitudinal feed motors 95 may then be reversed to cause the device to descend the tree under control of the operator.

Having fully described my invention, it is to be understood that I do not wish to be limited to the details herein set forth, but my invention is of the full scope of the appended claims.

I claim:

1. In a palm tree pruner, the combination of: an annular ring, a primary group of cutter assemblies supported on the ring, said cutter assemblies being individually rotatable about horizontal axes contained in a first horizontal plane, a secondary group of cutter assemblies supported on the ring and each individually rotatable about horizontal axes contained in a second horizontal plane, said planes being vertically spaced, cutter blades on each of the cutter assemblies having arcuate cutting edges adapted to contact the tree trunk, the cutting edges of the cutter assemblies in one group overlapping the cutting edges of the cutter assemblies in the other group to define the finished circumference of the tree trunk, and power means adapted to rotate each of said cutter assemblies.

2. In a palm tree pruner, the combination of: an annular ring, a primary group of cutter assemblies supported on the ring, said cutter assemblies being individually rotatable about horizontal axes contained in a first horizontal plane, a secondary group of cutter assemblies supported on the ring and each individually rotatable about horizontal axes contained in a second horizontal plane, said planes being vertically spaced, cutter blades on each of the cutter assemblies having arcuate cutting edges adapted to contact the tree trunk, the cutting edges of the cutter assemblies in one group overlapping the cutting edges of the cutter assemblies in the other group to define the finished circumference of the tree trunk, power means adapted to rotate each of said cutter assemblies, and means carried on the annular ring for simultaneously advancing or retracting the cutter assemblies in both groups in a direction substantially radially of the tree.

3. In a palm tree pruner, the combination of: an annular ring, a primary group of cutter assemblies supported on the ring, said cutter assemblies being individually rotatable about horizontal axes contained in a first horizontal plane, a secondary group of cutter assemblies supported on the ring and each individually rotatable about horizontal axes contained in a second horizontal plane, said planes being vertically spaced, cutter blades on each of the cutter assemblies having arcuate cutting edges adapted to contact the tree trunk, power means adapted to rotate each of said cutter assemblies, and additional power means for advancing the annular ring vertically upwardly relative to the tree trunk, the cutting edges of the cutter assemblies in one group overlapping the cutting edges of the cutter assemblies of the other group to avoid longitudinal irregularities in the palm tree after the cutters have passed.

4. In a palm tree pruner, the combination of: an annular ring, a plurality of cutter assemblies supported on the ring and encircling the tree trunk, said cutter assemblies being individually rotatable about horizontal axes, cutter blades on each of the cutter assemblies having arcuate cutting edges, the cutting edges of adjacent cutter assemblies overlapping to define the finished circumference of the trunk, and power means adapted to rotate each of said cutter assemblies, alternate cutter assemblies being vertically staggered to avoid interference of cutter blades.

CHARLES W. GRASHAM.

REFERENCES CITED

The following references are of record in the file of this patent:

UNITED STATES PATENTS

| Number | Name | Date |
|---|---|---|
| 742,447 | Kidder | Oct. 27, 1903 |
| 944,290 | Spaak | Dec. 28, 1909 |
| 1,680,372 | Fenn | Aug. 14, 1928 |
| 1,715,949 | Rich | June 4, 1929 |
| 1,811,155 | Rich | June 23, 1931 |
| 1,893,016 | Brown | Jan. 3, 1933 |
| 2,477,922 | Emery | Aug. 2, 1949 |
| 2,482,392 | Whitaker | Sept. 20, 1949 |

FOREIGN PATENTS

| Number | Country | Date |
|---|---|---|
| 233,629 | Switzerland | Nov. 1, 1944 |